Patented Jan. 5, 1954

2,665,307

UNITED STATES PATENT OFFICE 2,665,307

TRICHLOROACRYLYL CHLORIDE

Jack S. Newcomer, Wilson, N. Y., assignor to Sharples Chemicals Inc., a corporation of Delaware No Drawing. Application April 2, 1952, Serial No. 280,199

10 Claims. (Cl. 260—544)

The present invention relates to trichloroacrylyl chloride, a highly useful and versatile intermediate for chemical synthesis. It is particularly concerned with a novel process for preparing this acid chloride, the new process being outstandingly superior to procedures employed heretofore.

Prior to the present invention, trichloroacrylyl chloride ordinarily has been prepared as follows. In a first step, hexachloropropene is converted to trichloroacrylic acid by treatment of the former with sulfuric acid of about 90% concentration at elevated temperature, the reaction sometimes being carried out in the presence of aluminum sulfate. Although the chemistry involved in this reaction does not appear to be particularly complex, the procedure is attended by a number of disadvantages, namely: the reaction is difficult to control; the yield is somewhat poor; the product is of relatively low purity; isolation of the product involves considerable manipulation. In a second step, trichloroacrylyl chloride is prepared by treating trichloroacrylic acid with thionyl chloride, and since an excess of this reagent is usually employed, it is necessary to separate the desired product from excess thionyl chloride.

The present invention rests upon the discovery of a surprising reaction between hexachloropropene and one or more oxides of iron, such as ferrous oxide, ferric oxide, and ferrosic oxide, $Fe_3O_4$, the reaction products being trichloroacrylyl chloride and chlorides of iron.

Generally speaking, it is preferred that the reactants be employed in substantially stoichiometric amounts, although this is not required and an excess of either reactant may be employed if desired for any reason. Thus excess hexachloropropene may sometimes be employed to improve the fluidity of the reaction mixture, the excess serving as solvent or diluent. Excess ion oxide likewise does no harm, other than possibly leading to a reaction mixture of poor fluidity, although such tendency may be overcome by conducting the reaction in the presence of a solvent or diluent other than hexachloropropene, such solvent or diluent preferably being inert in the sphere of reaction. Among such inert materials there may be mentioned aliphatic hydrocarbons and chlorinated hydrocarbons having little or no unsaturation and preferably having initial boiling points of say 200° C. or higher, such as paraffin oils, certain kerosenes, keryl chlorides, etc. In fact, materials of this general character may be employed as inert reaction media regardless of whether the particular reactants are being used in stoichiometric or non-stoichiometric quantities. Aromatic materials are in general less preferred, because of their tendency toward undergoing side reactions.

The use of inert media, although helpful in certain instances, is not a necessary criterion for conducting the reaction successfully. Thus in a preferred embodiment of the invention, substantially stoichiometric amounts of reactants are brought together for reaction purposes in the absence of such media.

It is pointed out that when speaking of stoichiometric quantities of reactants, the molar ratio of iron oxide to hexachloropropene varies with the particular oxide under consideration, being 1:1 in the case of ferrous oxide, 1:3 in the case of ferric oxide, and 1:4 in the case of ferrosic oxide. A single oxide or a mixture of oxides may be used, as desired. It may be noted that ferrous oxide is somewhat subject to atmospheric oxidation, so that after prolonged storage it may have an appreciable ferric oxide content, although as will be seen, this is not objectionable.

The reaction mixture may be agitated or not agitated. However, agitation is preferred, since it improves contact between the reactants and thus permits attaining better yields of the desired product.

The reaction is exothermic and may be conducted at any suitable temperature. The temperature at which the reaction is initiated at a reasonable speed, although not known accurately, usually has been found to be approximately 110° C., particularly for ferric oxide, although it may be lower depending upon the conditions, including purity and degree of subdivision of the particular oxide employed. Reaction occurs readily between about 110° C. and 300° C., temperature conditions between 140° C. and 220° C. being quite satisfactory and particularly between 160° C. and 200° C. Temperatures much in excess of 300° C. are less preferred, because of possible thermal decomposition of organic reactant and/or product. It will be understood that, as in substantially all chemical reactions, the reaction rate may be controlled by change in temperature conditions, and that it is good practice to control temperature conditions so that the reaction proceeds at a reasonable rate, a rate which is either low or very high being preferably avoided. Means for temperature control are well known to persons skilled in the art, and it is merely necessary to point out that an exothermic reaction may require some cooling after it has been initiated. Thus some heat may be applied to get the reaction started, followed by some cooling to prevent temperature conditions from exceeding the chosen value, all of which is well understood by persons skilled in chemical synthesis.

For reasons of convenience, it is often preferred to carry out the process at atmospheric pressure, although at times subatmospheric or superatmospheric pressures may be employed to good advantage. For example, the use of superatmospheric pressures may be resorted to in order to prevent escape of hexachloropropene from the reaction zone, particularly when operating at relatively high temperature. On the other hand, the use of subatmospheric pressures is sometimes helpful, such as when it is desired to fractionate trichloroacrylyl chloride from the reaction mass at relatively low temperature, e. g., below the boiling point of the chloride at atmospheric pressure.

The iron oxide may be added to the hexachloropropene, or the addition may be carried out in reverse order, the former procedure usually being somewhat more convenient. Regardless of the order of addition, it is preferred that the addition be gradual, owing to the aforesaid exothermic nature of the reaction. Bringing the full charge of reactants together at one time is not advisable unless very efficient means of cooling is provided. A procedure which has given excellent results consists in gradually adding a slurry of hexachloropropene and iron oxide, maintained at room temperature, to hexachloropropene contained in the reaction vessel and pre-heated to about 190° C., the temperature of the reaction mixture being allowed to decline to say 170° C. during the addition.

If desired, trichloroacrylyl chloride may be continuously removed from the reaction zone as the reaction proceeds, such as by distillation, merely by the selection of suitable temperature and pressure conditions. Alternatively, the chloride may be allowed to remain partially or substantially completely within the reaction zone until the reaction has been completed, at which time the chloride may be separated from inorganic material by any desired means, e. g., by distillation, extraction with inert solvents, centrifuging, filtering, filter-pressing and the like, or by combinations of the same. The trichloroacrylyl chloride obtained by separation procedures such as those just described may be employed for many purposes without further purification. For certain other purposes, such as the preparation of fine chemicals, further purification may be desirable, e. g., by fractional distillation.

The process may be carried out batchwise, continuously, semi-continuously, or otherwise, as desired.

The invention broadly contemplates the use of not only synthetic oxides of iron for reaction purposes, but also of naturally occurring oxides (preferably pulverized) such as certain ores, e. g., hematite and magnetite. Although the naturally occurring oxides are lower in price, usually this advantage is outweighed by the better purity and uniformity of synthetic oxides. When naturally occurring oxides are employed, it is preferred that they not be hydrated.

The following examples describe specific embodiments of the invention, but it is not intended to limit the invention to these particular embodiments.

*Example 1*

The apparatus employed consisted of a 5-liter, 3-neck flask equipped with a stirrer, thermometer well, 1.5 foot Vigreaux column leading to a take-off condenser and receiver, and air-cooled open tube extending higher than the column. The apparatus was set up under a hood.

Hexachloropropene (5321 g.) was placed in the flask and heated to 190° C., stirring was commenced, and addition of commercial red ferric oxide was commenced through the open tube. The oxide was gradually added in portions of about 3 g. to 5 g. while maintaining the reaction mixture at about 190 C. by means of external heating. When sufficient trichloroacrylyl chloride and low boiling by-products had accumulated in the flask, reflux began and the product distilled to the condenser and thence to the receiver as rapidly as it reached the sidearm of the column. Upon continuing addition of ferric oxide, the boiling point of the reaction mixture tended to drop moderately, so that after 908 g. of ferric oxide had been added, distillation was rapid although the pot temperature had been allowed to fall to about 185° C.

At this point 2863 g. of hexachloropropene was added to the flask, while maintaining the reaction mixture at about the same temperature as noted immediately above. Ferric oxide (908 g.) was gradually added in the same small portions as noted previously. Upon completing this addition, distillation of product was continued until ferric chloride began to sublime to the upper part of the column and the pot was almost solid with ferric chloride.

The distillate, amounting to 5440 g., was rectified. There was thus obtained 1453 g. of low-boiling material having a boiling range of 74–156° C., and 3030 g. of trichloroacrylyl chloride having a boiling range of 158–160° C.

Rectification was discontinued when ferric chloride began to sublime to a small extent, although the temperature of the distillate remained at 160° C. The residue was cooled and combined with the residue from the original reaction flask. This combined residue was extracted with two portions of chloroform, one of 500 ml. and another of 1 liter. The total extract was rectified, 1415 g. of trichloroacrylyl chloride having a 158–160° C. boiling range being thus obtained.

The trichloroacrylyl chloride was a water-white liquid of pungent odor. The yield was approximately 70%.

A sample was identified by hydrolyzing it to trichloroacrylic acid with boiling water. The resulting trichloroacrylic acid melted at 75–76° C. and had a neutral equivalent of 176 (theory, 175.5).

*Example 2*

The apparatus employed was the same as in Example 1 except that the capacity of the 3-neck flask was 12 liters.

Hexachloropropene (3215 g.) was charged to the flask, heated to 190° C., and stirring was commenced. A slurry of 1905 g. of ferric oxide and 6000 g. of hexachloropropene was gradually added in 2.5 hours, the temperature being permitted to decline to 170° C. The rate of decline was so regulated that there was never more than an incipient reflux, and only about 10 g. of distillate was collected in the receiver. The reaction mixture was stirred 30 minutes more at 170° C. and was then cooled and filtered. The filtrate was fractionated to take off a heads fraction boiling up to 140° C.

The filter cake was extracted with chloroform, the extract was added to the above material which had been stripped of heads, and rectification was continued. There was thus obtained 6179 g. (a yield of approximately 86%) of trichloroacrylyl chloride of excellent quality.

*Example 3*

A mixture of 50 g. of hexachloropropene and 95 g. of ferrous oxide was heated in a distilling flask connected to a condenser, the heating being such as to effect rather slow distillation. A liquid product with a boiling range of 130–195° C. was obtained. Sublimation of iron chloride was noted toward the end of the distillation.

The distillate was fractionated in a Vigreaux column, but not until suspended iron chloride had been removed by filtration. There was thus obtained 24 g. of trichloroacrylyl chloride having a boiling range of 156–161° C. As a higher cut there was obtained about 12 g. of material boiling at 208–215° C. and consisting largely of unchanged hexachloropropene.

A sample of the trichloroacrylyl chloride was converted to trichloroacrylamide by means of aqueous ammonia. This product melted at 99° C. and did not depress the melting point of a known specimen of trichloroacrylamide.

In view of the rather highly exothermic character of the reaction, it is recommended that the usual precautions in the case of reactions of this kind be taken in order to avoid violent release of heat with attendant chance of generating explosive conditions. Thus it is preferred in large scale operations to avoid simultaneous addition of large quantities of the reactants, but to combine the reactants under such conditions as to avoid large surges in temperature. This may be done by adding the reactants in regulated quantities to each other, or by adding one of the reactants in regulated quantities to the other, or otherwise in any manner known to the art. Also in view of the possible formation of small amounts of toxic gases, e. g., phosgene, the reaction is preferably carried out under well-ventilated conditions, such as under a hood, or in the open air, or under other precautionary conditions to avoid any chance of injury to personnel.

It is to be understood that the more particular description given above is by way of illustration, and that various modifications are possible and will occur to persons skilled in the art upon becoming familiar herewith. Accordingly, it is intended that the patent shall cover, by suitable expression in the claims, the features of patentable novelty which reside in the invention.

I claim:

1. A process for the preparation of trichloroacrylyl chloride which comprises reacting at elevated temperature hexachloropropene and oxide of iron, and recovering from the reaction mixture the trichloroacrylyl chloride thus produced.

2. The process of claim 1 in which the reaction is conducted between 110° C. and 300° C.

3. The process of claim 2 in which ferrous oxide is employed.

4. The process of claim 2 in which ferric oxide is employed.

5. The process of claim 2 in which ferrosic oxide is employed.

6. The process of claim 1 in which the reaction is conducted between 140° C. and 220° C.

7. The process of claim 6 in which the reaction is conducted between 160° C. and 200° C.

8. The process of claim 7 in which the reaction is conducted at atmospheric pressure.

9. A process for the preparation of trichloroacrylyl chloride which comprises gradually adding ferric oxide to hexachloropropene, said reactants being employed in substantially stoichiometric quantities, maintaining mutual contact between said reactants in a reaction zone in which the pressure is atmospheric and temperature conditions range between 160° C. and 200° C., while continuously removing from said reaction zone at least a major portion of the trichloroacrylyl chloride which is formed in the reaction.

10. A process for the preparation of trichloroacrylyl chloride comprising gradually adding a hexachloropropene-ferric oxide slurry to hexachloropropene which is present in a reaction zone, the totality of hexachloropropene originally present in said slurry and in said reaction zone being substantially stoichiometric with respect to the ferric oxide, maintaining said reaction zone between 160° C. and 200° C. and at atmospheric pressure until the reaction has been substantially completed, retaining at least a major portion of the desired product within the reaction zone until the reaction has been substantially completed, and thereafter recovering said product from the reaction mass.

JACK S. NEWCOMER.

References Cited in the file of this patent

Beilstein, First Supplement, vol. II, page 187 (1929).